Patented Jan. 5, 1926.

1,568,458

UNITED STATES PATENT OFFICE.

ASA WILLARD JOYCE, OF NEWARK, NEW JERSEY, ASSIGNOR TO THE CHEMICAL FOUNDATION, INCORPORATED, OF NEW YORK, N. Y., A CORPORATION OF DELAWARE.

VAT DYES OF THE THIOINDIGO SERIES.

No Drawing. Application filed January 28, 1925. Serial No. 5,274.

*To all whom it may concern:*

Be it known that I, ASA WILLARD JOYCE, a citizen of the United States, residing at Newark, in the county of Essex and State of New Jersey, have invented certain new and useful Improvements in Vat Dyes of the Thioindigo Series, of which the following is a full, clear, and exact description, such as will enable others skilled in the art to which it appertains to make and use the same.

This invention relates to the manufacture of vat dyes of the thioindigo series and includes correlated improvements and discoveries relative to the production of such dyes.

An object of the invention is to provide a process for the manufacture of vat dyes of the thioindigo series whereby the same may be readily manufactured in an economical manner.

Another object of the invention is to provide vat dyes which are of value in the dyeing and printing of cotton and silk.

Another object of the invention is to provide vat dyes which will produce dyeings having orange-red to bluish-red shades.

Another object of the invention is to provide vat dyes which possess the property of fastness to light, chlorine, washing, alkalies and acids.

Other objects of the invention will in part be obvious and will in part appear hereinafter.

The invention accordingly comprises the several steps and relation and order of one or more of such steps with respect to each of the others, and the products possessing the features, properties, and the relation of elements, which are exemplified in the following detailed disclosure, and the scope of the application of which will be indicated in the claims.

In the practice of the invention, a 2-derivative of 4-methyl-6-chlor-3-oxy-1-thionaphthene, for example, 4-methyl-6-chlor-2.3-diketo-dihydro-1-thionaphthene-

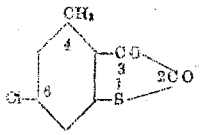

and other derivatives having substituent groups in the (2) position which react in a similar manner to the keto group, may be condensed with a 3-oxy-1-thionaphthene derivative having substituent groups in the benzene ring such as an alkyl-oxy group, and an alkyl-oxy and a halogen. This reaction yields new thioindigo vat dyes which dye animal and vegetable fibres from a hydrosulfite vat orange-red to bluish-red shades. Some of the dyes may be further halogenated, as brominated or chlorinated, thereby yielding products which are bluer in shade than the unhalogenated dye.

The reaction may be carried out by heating the derivatives above mentioned together in a suitable receptacle. This reaction may be accomplished in the presence of a solvent and/or in the presence of a condensation agent. When employing a solvent, utilization may be made of glacial acetic acid, benzene, toluene, nitrobenzene, etc., and when employing a condensing agent utilization may be made of zinc chloride, acetic anhydride and mineral acids.

The vat dyes produced when in the form of a dry powder are of an orange-red to a brown-red color. They are insoluble in water, alcohol and ether. They dissolve in nitrobenzene with the formation of an orange-red to a bluish-red solution and in concentrated sulphuric acid with the formation of a green solution. Further, they dissolve readily in alkaline hydrosulfite solutions forming yellow vats from which cotton and silk are dyed orange-red to bluish-red shades. The dyes produced possess excellent fastness to light, chlorine, washing, alkalies and acids.

As illustrative embodiments of a manner in which the invention may be carried into practice and of the products produced, the following examples are presented: The parts are by weight.

Example 1.

22.8 parts of 4-methyl-6-chlor-2.3 diketo-dihydro-1-thionaphthene-2-oxime are dissolved in 250 parts of glacial acetic acid with the aid of heat. When completely dissolved a solution of 27.3 parts of 4-brom-6-ethoxy-3-oxy-1-thionaphthene in 200 parts of glacial acetic acid are added and the mixture heated at 100° C. for two hours, or until the formation of the new dye is complete. After cooling to room temperature, the dye which separates is filtered, washed and dried. It constitutes a brick-red powder which dissolves in concentrated sulfuric acid to a green solution. With hydrosulfite and caustic soda it yields a yellow vat from which cotton is dyed a clear bluish-red, after being soaped.

*Example 2.*

33.9 parts of p-dimethylamino-4-methyl-6-chlor-2.3-diketo-dihydro-1-thionaphthene-2-anil are dissolved in 500 parts of glacial acetic acid by heating to boiling under reflux for 15 to 20 minutes. A solution of 19.5 parts of 6-ethoxy-3-oxy-1-thionaphthene in 200 parts of glacial acetic acid is now added and the mixture boiled for two hours or until the condensation is completed. After cooling to room temperature, the dye is filtered, washed and dried. It constitutes a bright orange-red powder, soluble in concentrated sulfuric acid with a green color. It is easily soluble in the alkaline hydrosulfite vat from which cotton is dyed a bright orange-red, possessing excellent fastness to light, chlorine and washing.

The mother liquors contain p-amino-dimethyl-aniline, a useful by-product, which may be recovered without difficulty from the liquor.

*Example 3.*

29.0 parts of p-dimethylamino-6-ethoxy-2.3-diketo-dihydro-1-thionaphthene-2-anil are condensed with 20.0 parts of 4-methyl-6-chlor-3-oxy-1-thionaphthene under the conditions described in Example 2. The dye formed is identical with that obtained in Example 2.

*Example 4.*

37.6 parts of the dye formed in either of the foregoing Examples 2 or 3 are dissolved in 1000 parts of concentrated sulfuric acid by the aid of slight warming and stirring. When the dye is dissolved, the solution is cooled to room temperature and ½ part of iodine crystals added. Then, during the course of about two hours, 16.0 parts of liquid bromine are added. The bromination proceeds smoothly at room temperature and may be completed without warming.

When free bromine can no longer be detected, the mixture is poured into a large volume of ice and water, whereby the new monobrominated dye separates in bright red flocks, which are filtered, washed, and dried. It consists of a bright red powder, yielding a green solution in concentrated sulfuric acid. Cotton is dyed from the alkaline hydrosulfite vat a bright bluish-red of excellent fastness to light, chlorine and washing.

A dibrominated product may be obtained by using double the quantity of bromine as is used for the monobrominated dye. However, to complete the bromination, it may be necessary to warm to a temperature of about 45–50° C. toward the end of the reaction. The dibrominated dye is bluer in shade than the monobrominated product, but in other respects, its properties are similar.

The brominations may also be carried out in other solvents such as nitrobenzol, trichlorbenzol, etc.

*Example 5.*

A current of chlorine is passed into the sulfuric acid solution of the dye as prepared in the foregoing Example 4 until 71 parts have been allowed to react. The new monochlorinated dye can be isolated in a manner similar to the brominated products. Double the quantity of chlorine gives a dichlorinated product with similar properties to the mono-chlorinated dye.

The chlorinated products are not as blue in shade as the brominated dyes, but in comparison with the unhalogenated dye, they have increased fastness to light, chlorine and washing.

In the production of chlorinated products other solvents may be used such as nitrobenzol, chlorbenzols, etc.; likewise, other chlorinating agents, as sulfur chloride, sulfuryl chloride, etc.

As illustrative of other derivatives of 4-methyl-6-chlor-3-oxy-1-thionaphthene than 4-methyl-6-chlor-2.3-diketo-dihydro-1-thionaphthene which may be used, reference is made to p-dimethyl-amino-4-methyl-6-chlor-2.3-diketo-dihydro-1-thionaphthene-2-anil-

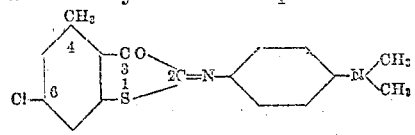

4-methyl-6-chlor-2.3-diketo-dihydro-1-thionaphthene-2-oxime-

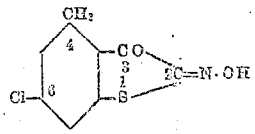

and 5-methyl-6-chlor-2-dibrom-2.3-diketo-dihydro-1-thionaphthene.

As illustrative of derivatives of 3-oxy-1-thionaphthene having substituent groups in the benzene ring which may be advantageously employed, reference is made to 6-ethoxy-3-oxy-1-thionaphthene-

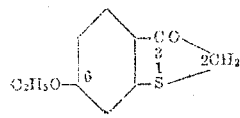

4-brom-6-ethoxy-3-oxy-1-thionaphthene-

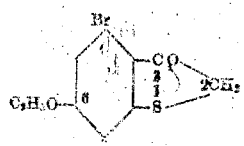

and 4-methoxy-3-oxy-1-thionaphthene.

While the constitution of the vat dyes herein described is not definitely known, it is believed that their constitution is most probably represented by the following general structural formula:

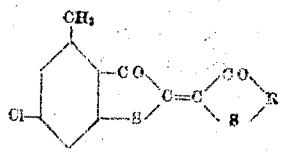

wherein R indicates an aryl group which may contain as a substituent group, an alkyl-oxy group, chlorine and bromine.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process for the manufacture of vat dyes of the thioindigo series which comprises condensing a 2-derivative of 4-methyl-6-chlor-3-oxy-1-thionaphthene with a 3-oxy-1-thionaphthene having an alkyl-oxy-group substituted in the benzene ring.

2. A process for the manufacture of vat dyes of the thioindigo series which comprises condensing a 2-derivative of 4-methyl-6-chlor-3-oxy-1-thionaphthene with a 3-oxy-1-thionaphthene having an alkyl-oxy and a halogen substituted in the benzene ring.

3. A process for the manufacture of vat dyes of the thioindigo series which comprises condensing a 2-derivative of 4-methyl-6-chlor-3-oxy-1-thionaphthene with an alkyl-oxy-3-oxy-1-thionaphthene and halogenating the condensation product.

4. A process for the manufacture of vat dyes of the thioindigo series which comprises condensing a 2-derivative of 4-methyl-6-chlor-3-oxy-1-thionaphthene with a derivative of an alkyl-oxy-3-oxy-1-thionaphthene.

5. As new products, the herein described vat dyes of the thioindigo series, having most probably the following general structural formula:

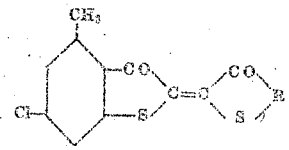

wherein R indicates an aryl group, containing as a substituent an alkyl-oxy group, being in a dry state red powders, insoluble in water, alcohol and ether, soluble in nitrobenzene with an orange-red color, soluble in concentrated sulfuric acid with a green color, forming with an alkaline hydrosulfite solution yellow vats, from which animal and vegetable fibres are dyed orange-red shades, which are fast to light, chlorine and washing.

6. As new products, the herein described vat dyes of the thioindigo series having most probably the following general structural formula:

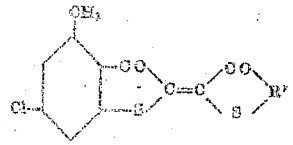

wherein R' indicates an aryl group containing as substituents an alkyl-oxy group and a halogen, being in a dry state red powders, insoluble in water, alcohol and ether, soluble in nitrobenzene with a bluish-red color, soluble in concentrated sulfuric acid with a green color, forming with an alkaline hydrosulfite solution yellow vats, from which animal and vegetable fibres are dyed bluish-red shades, which are fast to light, chlorine and washing.

7. As a new product, the herein described thioindigo vat dye of the following probable constitutional formula:

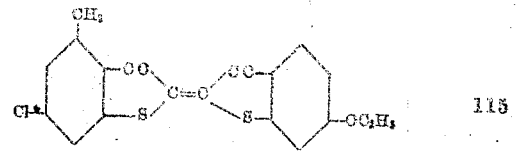

derived by the condensation of 4-methyl-6-chlor-2,3-diketo-dihydro-1-thionaphthene and its 2-keto equivalents with 6-ethoxy-3-oxy-1-thionaphthene, being in a dry state an orange-red powder, insoluble in water, alcohol and ether, soluble in nitrobenzene with an orange-red color and yielding in concentrated sulfuric acid a green solution, forming with an alkaline hydrosulfite solution a yellow vat from which animal and vegetable fibres are dyed bright orange-red shades, fast to light, chlorine and washing.

8. As a new product, the herein described thioindigo vat dye of the following probable constitutional formula:

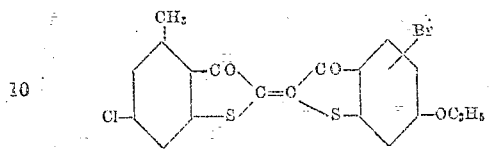

derived by the bromination of the condensation product from 4-methyl-6-chlor-2.3-diketo-dihydro-1-thionaphthene and its 2-keto equivalents with 6-ethoxy-3-oxy-1-thionaphthene being in a dry state a bright red powder, insoluble in water, alcohol and ether, soluble in nitrobenzene with a bluish-red color, soluble in concentrated sulfuric acid with a green color, forming with an alkaline hydrosulfite solution a yellow vat, from which animal and vegetable fibres are dyed bright bluish-red shades, fast to light, chlorine and washing.

In testimony whereof I affix my signature.

ASA WILLARD JOYCE.